Jan. 9, 1945.  H. L. NEWELL  2,367,044
TOASTER
Filed Oct. 8, 1941  3 Sheets-Sheet 1

Inventor:
Heber L. Newell,
by Harry E. Dunham
His Attorney.

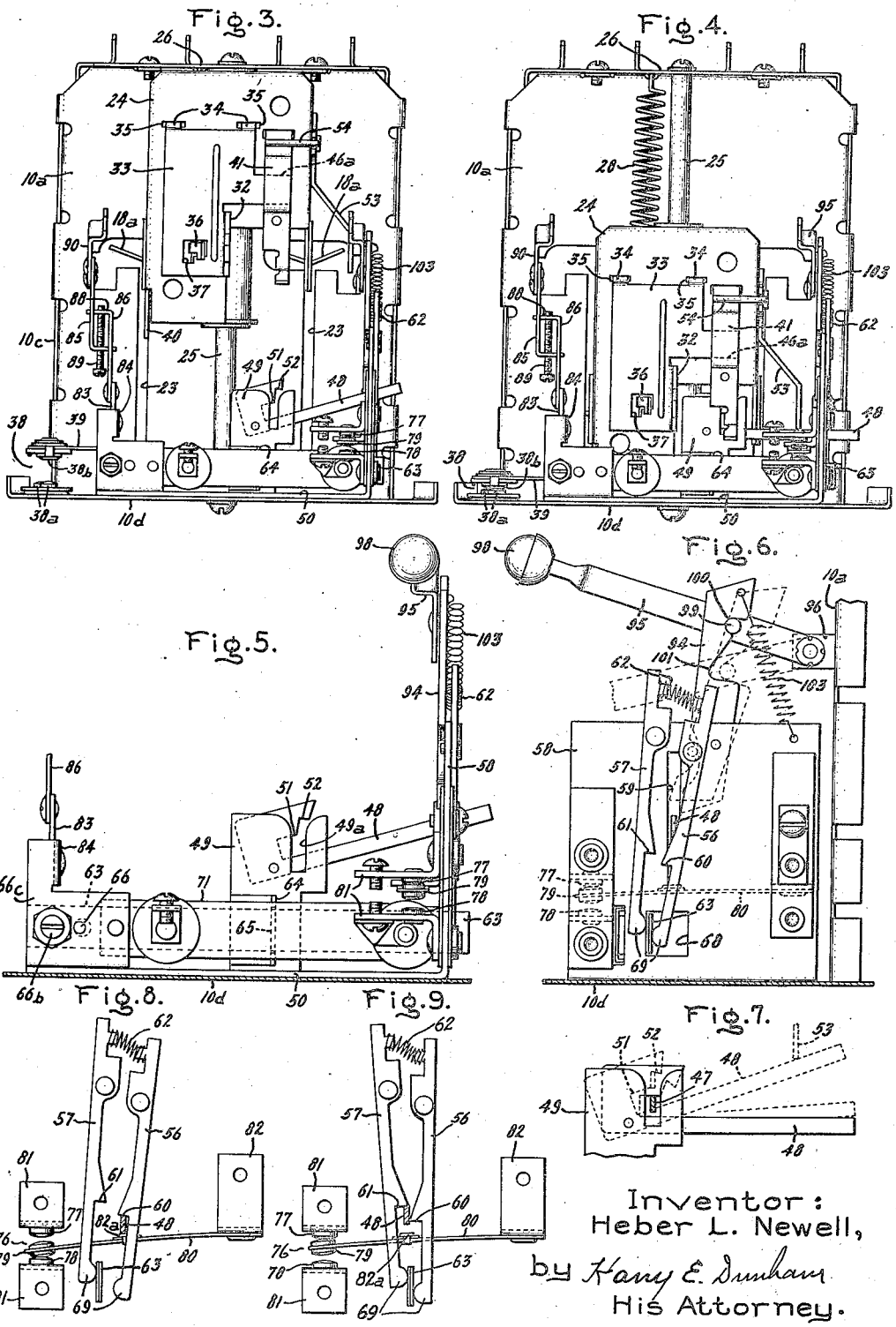

Jan. 9, 1945. H. L. NEWELL 2,367,044
TOASTER
Filed Oct. 8, 1941 3 Sheets-Sheet 3

Inventor:
Heber L. Newell,
by Harry E. Dunham
His Attorney.

Patented Jan. 9, 1945

2,367,044

UNITED STATES PATENT OFFICE 2,367,044

TOASTER

Heber L. Newell, Bridgeport, Conn., assignor to General Electric Company, a corporation of New York Application October 8, 1941, Serial No. 414,129

4 Claims. (Cl. 99—329)

This invention relates to toasters, more particularly to electrically heated bread toasters, and it has for its object the provision of an improved device of this character.

More specifically, this invention relates to automatic toasters provided with a thermally-operable timing mechanism, and especially, to one provided with a "heat-up" and "cool-down" thermally-operable timer. In toasters of this character, the toasting period is measured by the time required to heat a temperature responsive member to a predetermined high temperature, and also the time consumed in allowing it to cool.

This invention contemplates a toaster of this character having an improved organization of parts which operates in a reliable and efficient manner and which provides a uniformly toasted product; and further, one which can be produced at a reasonably low manufacturing cost.

In accordance with this invention, the toaster is provided with a slice carrier in a toasting chamber mounted for movement between toasting and non-toasting positions. The carrier is biased to its non-toasting position by suitable means, such as a spring. The slice carrier is provided with a pair of trip latches which are arranged to successively function to hold the carrier in toasting position against the force of the spring. A thermostat is provided for controlling the operation of the trip latches. This element is heated and cooled to move from a first position to a second position and return to the first all while the toaster is operating to toast the bread. The thermostat when heated to move to the second position operates one of the trip latches to release the carrier for engagement by the second trip latch to hold it; and when it cools it operates the second trip latch to release the carrier and permit it to move to its non-toasting position.

Improved means are provided for effecting the initial latching of the carrier; for initiating the operation of the thermostat; and for starting the toasting operation; all responsively to the movement of the carrier into its toasting position.

Also, suitable improved means are provided for supporting the thermostat and for controlling it so as to vary its heating and cooling periods, and hence, the toasting intervals.

Figure 1:
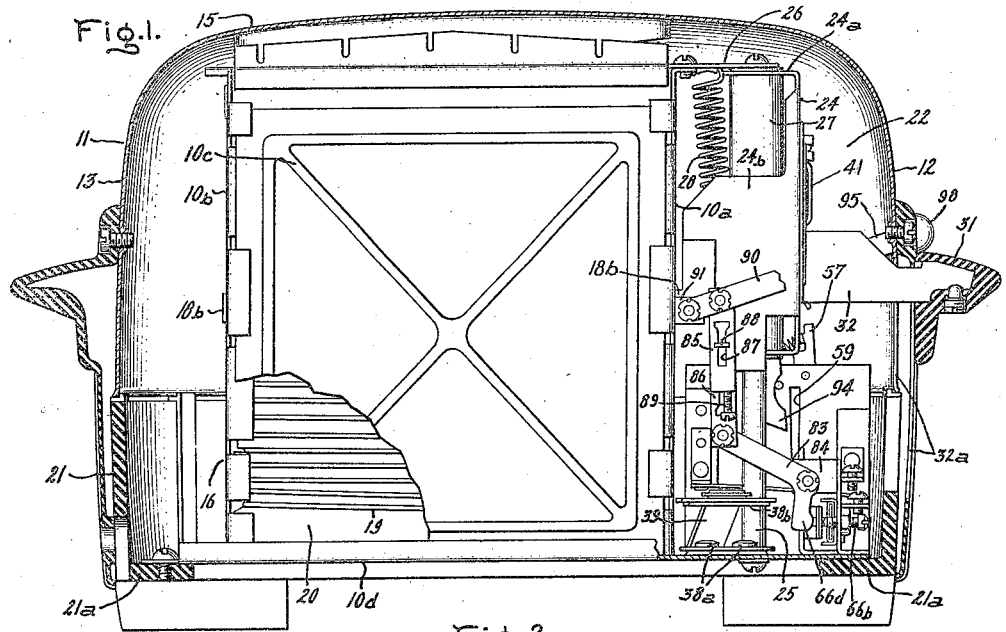
Figure 2:
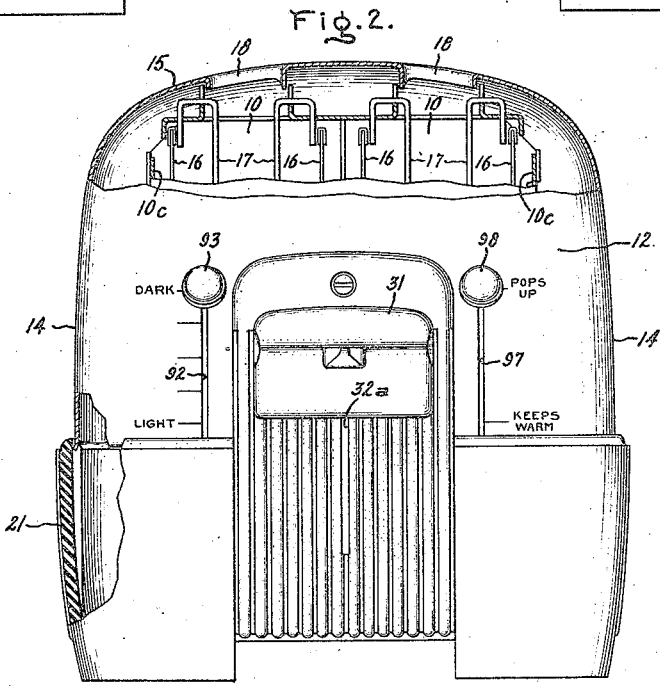
Figure 10:
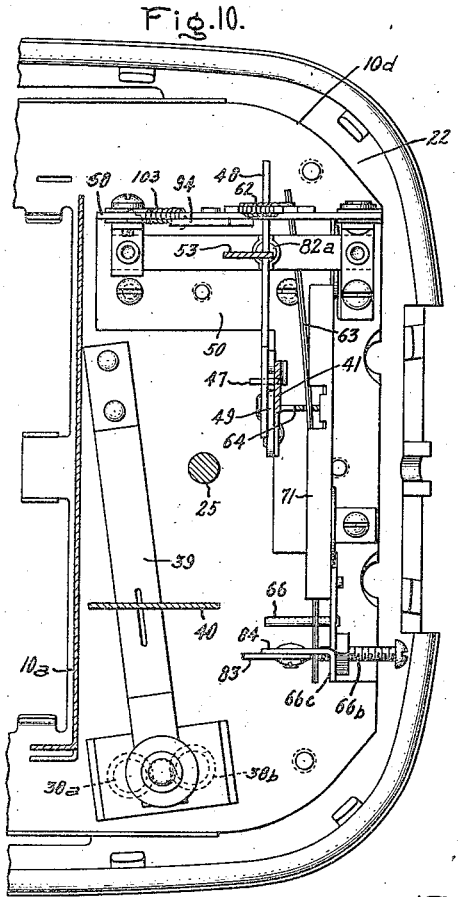
Figure 15:
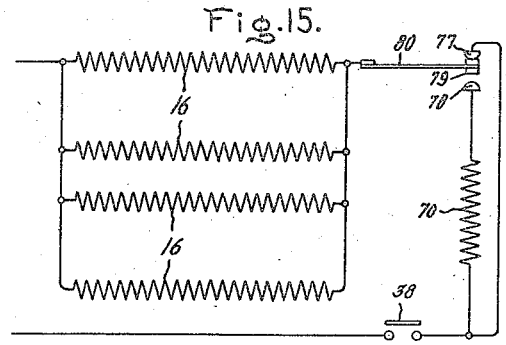
Figure 13:
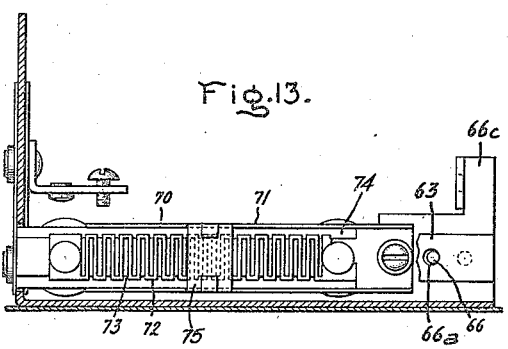
Figure 11:
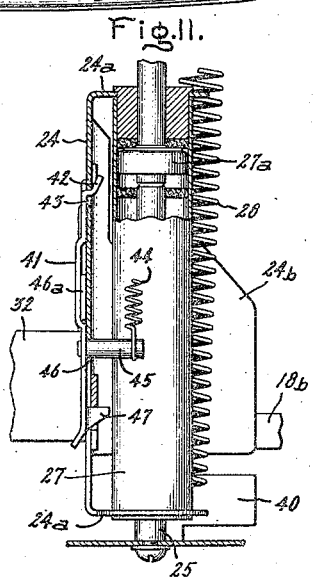
Figure 12:
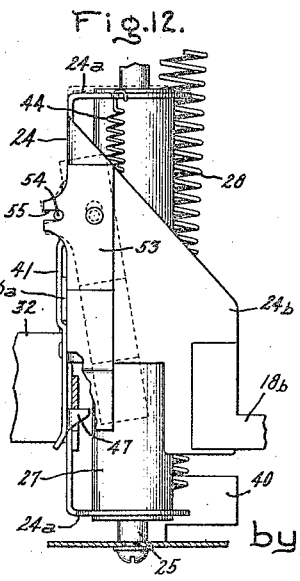
Figure 14:
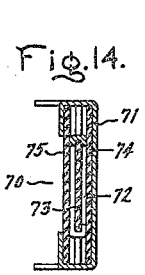

For a more complete understanding of this invention, reference should be had to the accompanying drawings in which Fig. 1 is a side elevation of an automatic electric toaster embodying this invention, parts of the toaster being shown in section and other parts being broken away so as to illustrate certain details of construction; Fig. 2 is a front elevation of the electric toaster of Fig. 1, parts being broken away so as to illustrate certain details of construction; Fig. 3 is a front elevation of the toaster mechanism of Figs. 1 and 2, the outer casing of the toaster being removed; Fig. 4 is a view similar to Fig. 3, but illustrating certain parts of the toaster mechanism in different operative positions; Fig. 5 is a front elevation of a thermally operable timing mechanism used in controlling the toaster of Figs. 1–4 inclusive, and drawn on a larger scale than Figs. 1–4; Fig. 6 is a side elevation of the timing mechanism of Fig. 5; Fig. 7 is a fragmentary view of a portion of the timing mechanism of Figs. 5 and 6; Figs. 8 and 9 are fragmentary side elevations illustrating a portion of the mechanism shown in Fig. 6, the parts occupying different operative positions in the two figures; Fig. 10 is a plan view of portions of the toaster mechanism; Fig. 11 is a fragmentary sectional view taken through a portion of the toaster mechanism; Fig. 12 is an elevation of the portion of the mechanism shown in Fig. 11, a part being shown in section so as to illustrate certain constructional details; Fig. 13 is an elevation of a portion of the toaster mechanism including suitable auxiliary heating means for the thermally-operable timer; Fig. 14 is a sectional view taken through the line 14—14 of Fig. 13 and looking in the direction of the arrows; and Fig. 15 is a diagrammatic representation of the heating elements of the toaster, the auxiliary heating means of Figs. 13 and 14, and certain of the control elements therefor.

Referring to the drawings, this invention has been shown in one form as applied to an automatic electric bread toaster in which the toasted slices may be ejected at the end of the toasting interval. This toaster comprises a pair of heating chambers 10 (Fig. 2) spaced apart cross-wise of the toaster, and which are housed in a casing having front and rear walls 10a and 10b, side walls 10c, and a bottom wall 10d. This heating chamber casing is mounted in an outer casing member 11 which is provided with a front wall 12, a rear wall 13, side walls 14, and a top wall 15. It will be understood that each heating chamber will be provided with a pair of spaced heating elements 16 arranged on opposite sides of the heating chamber; these elements are positioned to apply heat to the opposite sides of a piece of bread inserted in the heating chamber, and prevented from contacting the elements by means of wire guides 17. The top wall 15 of the outer casing member is provided with elongated slots 18 through which the slices can be inserted into the heating chambers and withdrawn therefrom. Suitable slice supports or carriers 18a (Figs. 1, 3 and 4) are mounted within the toasting chambers 10 for supporting the slices. These holders are adapted to be moved from upper non-toasting positions to lower toasting positions in the heating chambers.

The heating elements 16 may be of any suitable type, but preferably will be of the type which is provided with resistance ribbons 19 (Fig. 1) supported on suitable vertically positioned sheets 20 formed of a suitable electrically insulating material, such as mica.

The casing member 11 is mounted upon a suitable base and casing member 21 which is provided with front, side and rear walls that support the front, side and rear walls respectively of the casing 11; preferably, the base 21 will be formed of a suitable molded plastic, such as a phenol condensation product.

The heater chamber casing comprising the walls 10a, 10b, 10c and 10d is also supported on the base 21, the casing being provided with suitable supporting abutments 21a upon which this casing assembly rests and to which it is secured, as clearly shown in Fig. 1.

The casings 11 and 21 not only function to house the heating chambers 10 and their heating elements, but also are sufficiently large to define a chamber 22 at the front, as clearly shown in Figs. 1 and 10. Mounted within the chamber 22 are suitable means for operating the trays 18a, and also suitable means for timing the toasting operations.

The slice holders 18a at their forward ends are provided with portions 18b (Figs. 1, 3, 11 and 12) that project forwardly into the chamber 22 through the front wall 10a of the heating chambers, this front wall being provided with vertical slots 23 which receive the projecting portions of the holders and which provide for vertical movement of the holders in the chambers. The portions extending into the chamber 22 are attached to a suitable supporting carriage 24 which is mounted for vertical movement in this chamber. This carriage, as shown, is provided with a front face plate, at the top and bottom of which are rearwardly extending flanges 24a, and at the sides of which are rearwardly extending flanges 24b. The slice carriers are secured directly to these side flanges 24b, as shown more clearly in Figs. 11 and 12. The flanges 24a function to support the carriage for vertical sliding movement upon a suitable supporting rod 25 positioned vertically within the chamber 22. This rod is secured at its lower end to the bottom wall 10d, and at its upper end is secured to a suitable bracket 26. As shown more clearly in Figs. 11 and 12, the flanges 24a are secured to a cylinder 27 of a suitable dash pot mechanism which functions to damp the motion of the slice carriers upwardly in the heating chambers. Mounted within the cylinder 27 is a suitable piston 27a fixed upon the rod 25; this piston functions to control the flow of air between it and the cylinder in order to control the movement of the carriage 24, and hence, of the bread carriers secured to it.

Also mounted within the chamber 22 is a relatively strong tension spring 28 whose function is bias the carriage 24 upwardly and thereby the trays 18a to their non-toasting positions in the heating chambers. This spring is anchored at its upper end to the bracket 26 and at its lower end is anchored to the carriage 24.

A main control knob or handle 31, located outside of the front walls of the casing members 11 and 21, is connected to the carriage 24 for moving it from its upper non-toasting position to its lower toasting position. This handle, as shown, is connected to the carriage by means of a tongue 32 which is connected with the carriage and which extends through a vertical slot 32a provided in the front walls of the casing members. The tongue 32 is mounted upon a plate-like bracket 33 which in turn is mounted upon the carriage 24. As shown, the bracket at its upper end is provided with hinge lugs 34 which are hinged to the carriage 24 by means of slots 35 in the carriage (Figs. 3 and 4). The front plate of the carriage 24 is provided with a stop 36 (Figs. 3 and 4) which projects through a slot 37 provided for it in the bracket 33 and which engages a wall of the bracket to limit the pivotal movement of the bracket on the hinges 34 outwardly away from the plate. By reason of the foregoing arrangement, the lower end of the bracket 33 can be pivoted outwardly away from the carriage 24 for a limited distance.

The carriage 24 not only functions to lower the bread slices to their lower toasting positions in the chambers 10, but it also functions to control a main control switch 38 connected in the energizing circuit of the toaster heating elements 16. This switch comprises a pair of fixed contacts 38a (Figs. 1, 3, 4 and 10) mounted on the plate 10d and electrically insulated from it and from each other by any suitable means; and a bridging contact 38b which is carried by a spring arm 39 mounted on the plate 10d and from which the contact is insulated, and which by its inherent resiliency yieldingly holds the bridging contact out of engagement with the fixed contacts. The carriage at its lower end carries a depending arm 40 (Figs. 3 and 10) which engages the arm 39 to depress it from its position of Fig. 3 to its position of Fig. 4 so as to close the switch 38 when the bread slices are lowered.

Suitable means are provided within the chamber 22 for latching the carriage in its lower position of Fig. 4 in order to hold the bread slices down in their toasting positions against the force of the spring 28, and for timing a toasting period and releasing the carriage 24 to permit the bread slices to be removed from their toasting positions by means of this spring upon the completion of the toasting operation.

For the purpose of holding the carriage down against the force of the spring 28, a suitable hold-down latch 41 (shown more clearly in Figs. 3, 4, 11 and 12) is pivotally mounted at its upper end to the front face plate of the carriage 24. As shown, the pivotal connection is provided by means of a hinge lug 42 (Fig. 11) formed on the upper end of the latch and which is received in a vertically elongated aperture 43 provided for it in the front plate. This latch is biased upwardly so that the hinge lug is forced to the upper end of the slot 43 by means of a tension spring 44 which is anchored at its upper end to the upper flange 24a of the carriage and at its lower end is secured to a pin 45; this pin is rigidly secured to the rear face of the latch 41 and extends through a vertically elongated aperture 46 provided for it in the front plate of the carriage. The hold-down latch, therefore, is not only mounted for pivotal movement away from and toward the front plate of the carriage, but also is mounted for vertical movement along this front plate.

The bracket 33 is provided with an extension 46a (Figs. 3 and 11) interposed between the hold-down latch 41 and the carriage. This serves a purpose which will be described in greater detail hereinafter.

Projecting inwardly from the lower end of the rear face of the hold-down latch 41 is a locking projection 47. This projection is arranged to be engaged by a latch arm 48 of a suitable thermally operable timing mechanism. This latch arm, as shown, is pivoted upon a suitable upright bracket 49 which in turn is mounted upon a base plate 50; this plate in its turn is secured to the bottom plate 10d. The latch arm 48 is provided with a pair of vertically spaced locking steps 51 and 52. The step 51 is adapted to engage the projection 47 on the hold-down latch so as to lock the carriage 24 in its lower position. For this purpose, the latch arm 48 is moved downward from its position of Figs. 3 and 5 to its position of Fig. 4, that is, from its dotted line position of Fig. 7 to its solid line position of this figure, when the carriage is lowered. The carriage 24 carries a loading arm 53 for depressing the latch arm 48 when the carriage is lowered. As shown more clearly in Figs. 3, 4, 10 and 12, the loading arm 53 is pivotally mounted at its upper end to one of the side flanges 24b of the carriage so that when the carriage is depressed the lower end of the loading arm engages the latch arm 48 to depress it. Thus, when the carriage is depressed, the loading arm moves the latch arm to its depressed locking position (Figs. 4 and 7), and then the projection 47 engages the latch arm, pivots the hold-down latch away from the carriage and finally falls in below the step 51. The lower end 41a (Fig. 11) of the hold-down latch is flared outwardly to facilitate the pivoting action of the hold-down latch by its engagement with the latch arm. The bracket 49 is provided with a slot 49a (Fig. 5) having curved upper edges to guide the projection 47 into position under the step 51.

When the carriage 24 has been depressed and latched by means of the arm 48, the loading arm 53 is automatically withdrawn from the position above the latch arm by the hold-down latch 41 so that subsequently the arm 48 can pivot upwardly to release the carriage. For this purpose, there is secured to the upper end of the hold-down latch a transverse pin 54 which is received in a slot 55 (Fig. 12) provided for it in the loading arm 53 at one side of the pivotal connection between this arm with the flange 24b. By reason of this connection, after the carriage has been lowered by the knob 31 so that the projection 47 is engaged by the step 51 of the latch arm 48, and the knob released, the carriage 24 will be moved upwardly slightly by the spring 28, the extent of this movement being equal to the movement required to bring the hinge lug 42 of the hold-down latch 41 from the lower end of the slot 43 in the carriage and into engagement with the upper edge of this slot. This movement will be sufficient to rotate the loading arm 53 from its solid line position of Fig. 12 to its dotted line position of this figure, that is, to remove it from its position over the latch arm 53.

The latch arm 48 is secured in its lower full line locking position of Figs. 4 and 7 against the force of the spring 28 by means of trip-out latches 56 and 57. These latches, as shown more clearly in Fig. 6, are pivoted to the upright plate 58 upon opposite sides of an elongated vertical slot 59 formed in this plate and through which the end of the latch arm 48 projects, as clearly shown in Figs. 5 and 6. Intermediate their ends, the trip-out latches 56 and 57 are provided with hooks or abutments 60 and 61 respectively, which function to successively engage the latch arm to hold it down. As shown, the abutment 61 is spaced slightly above the abutment 60; this is accomplished by positioning the pivotal connection of the trip latch 57 on the plate 58 somewhat above that between the latch 56 and this plate. Interposed between the upper ends of the trip latches beyond their pivotal connections with the plate 58 is a suitable compression spring 62 which biases these upper ends apart, as viewed in Figs. 6, 8 and 9, that is, biases their lower ends together.

The trip latches 56 and 57 are controlled so that first the hook 60 engages the arm 48 to hold it in toasting position, then the hook 61 engages this arm to hold it in toasting position, and finally at the end of the toasting period, the hook 61 releases it to permit the ejection of the toast by the spring 28.

For the purpose of controlling the trip latches in this way, a suitable temperature responsive element 63 is provided. This element, as shown, is of the bimetallic type, being formed of two strips of metal having dissimilar coefficients of thermal expansion secured together lengthwise from end to end so that the element bows in response to temperature changes. This element is mounted above the base 50 in edgewise relation to it in a suitable bracket 64 positioned intermediate its ends, and which is provided with a vertical slot 65 in which the element is loosely received. The left-hand end of the bimetal element 63, as viewed in Figs. 3, 4 and 5, that is, its lower end, as viewed in Fig. 10, and its right-hand end, as viewed in Fig. 13, is supported by means of a pin 66 which is supported on the bracket 66c; the bimetal element is provided with an aperture 66a (Fig. 13) which receives this pin and which has a diameter somewhat larger than that of the pin. The bracket 64 and the pin 66 merely function to support the bimetal element, but do not in any way offer any restriction to the free bending movement of the element responsively to temperature changes; in other words, they provide for free "floating" movement of the bimetal. Movement of the end of the bimetallic element mounted on the pin 66 is limited by means of an adjustable abutment 66b mounted in a bracket 66c and a pivotally mounted adjustable abutment 66d (shown more clearly in Fig. 1).

The right-hand end of the bimetal element 63, as viewed in Figs. 3, 4 and 5, that is upper end, as viewed in Fig. 10, is projected through rectangular shaped aperture 68 formed in the plate 58, as more clearly shown in Fig. 6. This end of the bimetal element is received between the lower ends of the trip-out latches 56 and 57, which ends, as shown, preferably will be provided with rounded protuberances 69 extending toward each other and which are adapted to be engaged by the sides of the bimetallic element.

The bimetallic element is intended to be heated to a predetermined high temperature and then cooled down to measure the toasting period, and when heated up to the predetermined temperature it functions to cause the trip latch arm 56 to disengage the latch arm 48 to permit it to be engaged by the trip latch 57, and when it cools down to the predetermined temperature it functions to release the latch arm from the trip latch 57 to terminate the toasting operation. For the purpose of controlling the heating of the bimetallic element there is provided an auxiliary heating element 70 mounted within a suitable metallic shield 71 mounted in close relationship to the bimetallic element 63. The heating element 70, as shown more clearly in Figs. 13 and 14, comprises a resistance conductor 72 clamped around a support 73 formed of any suitable electrically insulating material, such as mica. The assembly of the resistance conductor 72 and its support 73 are electrically insulated from the shield 71 by means of a sheet 74 formed of any suitable electrically insulating material, such as mica, and is electrically insulated from the temperature responsive element 63 by means of a similar shet of electricaly insulating material 75.

The heating element 70 is controlled to be energized when the carriage 24 is depressed to its toasting position, and is subsequently deenergized when the bimetallic element 63 has been heated to the predetermined high temperature by means of a control switch 76; this switch comprises a pair of spaced fixed contacts 77 and 78 and a contact 79 movable between them. The movable contact 79 is mounted upon a spring arm 80. As shown, the fixed contacts 77 and 78 are mounted upon suitable conducting brackets 81 which are mounted upon the plate 58 and electrically insulated from it in any suitable way, and which function to connect the contacts into the circuit to be described presently; the switch arm 80 is mounted upon a bracket 82 which also is secured to the plate 58 and electrically insulated from it.

The spring arm 80 normally biases the contact 79 into engagement with the fixed contact 77, but is depressed against the force of its natural bias to engage the contact 78 by means of the latch arm 48 when this arm is depressed responsively to the lowering of the carriage 24 to start the toasting operation; as shown, the switch arm 80 carries an insulating button 82a positioned to be engaged by the latch arm when it is depressed. When the switch arm 80 is depressed to close the contact 78, the auxiliary heater 70 is connected directly in series with the main heating elements 16 of the toaster, as shown diagrammatically in Fig. 15. Therefore, both the main elements 16 and the auxiliary element 70 are energized by the closure of the main switch 38, which closure happens substantially simultaneously with the closing of the contacts 78 and 79.

The heater 70 heats the bimetallic element so as to cause its trip-out latch controlling end to move from its position of Fig. 8 toward its position of Fig. 9, that is, to bow toward the left, as viewed in Fig. 10. It will be understood that because the bimetallic element is mounted for free "floating" movement in its supports, and because the trip latches 56 and 57 offer some resistance to the movement of the trip latch end of the element, the other end of the element—its lower end as viewed in Fig. 10—will first move toward the left, as viewed in this figure and also in Fig. 1, until it engages the stop 66d, whereupon further movement of this end will be constrained, and the opposite end—the trip latch end, will then bow toward the left, as viewed in Fig. 10, which movement is a movement toward the right as viewed in Figs. 8 and 9. This operation of the bimetallic element will move the trip latches counterclockwise, as viewed in Figs. 8 and 9, and thereby cause the tooth 60 of trip latch 56 to release the latch arm 48, and the tooth 61 of trip latch 57 to move into its path of movement. As soon as this happens the main spring 28 quickly elevates the carriage 24 into engagement with the tooth 61. This operation of the latch arm 48 releases the resilient switch arm 80 so that it opens the contact 78 and closes the contacts 77 and 79; and this operation of the switch short-circuits the heater 70, but maintains the energization of the toaster heating element 16, as will be clear by an inspection of Fig. 15.

It is to be noted here that when the lever 48 pivots from the tooth 60 to the tooth 61 it does not release the projecion 47 which remains in engagement with the latch arm step 51 during this movement of the latch arm.

When the heater 70 is deenergized, the bimetallic element 63 at once begins to cool and return toward its initial position of Fig. 8, its bowing action in cooling being the reverse of that it had when heating up; that is, its lower end of Fig. 10 will first move to the right until it engages the fixed top 66b, whereupon the other end will move toward the right, as viewed in this figure, that is, towards the left, as viewed in Figs. 8 and 9. As this other end advances toward its position of Fig. 8 it will move the trip latches 56 and 57 in the clockwise direction until eventually the tooth 61 will disengage the latch arm 48 to release the carriage 24 and permit it to move upwardly to remove the toasted slices from their toasting positions.

It will be understood that when the latch arm 48 is released the projection 47 will ride up freely over the steps 51 and 52 of the latch arm and will carry the latch arm upwardly with it. When the projection leaves the steps the arm 48 will drop down into engagement with the trip latch 56 where it will be held, as more clearly shown in Fig. 6, until the carriage 24 is again depressed.

Also it is to be observed that when the carriage 24 is released, the hold-down latch tension spring 44 will immediately elevate the hold-down latch 41 to its upper position in the slot 53, and that this operation will return the loading arm 53 to its full line position of Fig. 2, all ready for another toasting operation.

After the toasting operation has been completed, the knob 31 may be depressed in order to start a new toasting operation. If this action takes place within such a period of time after the preceding toasting operation has been completed that some stored heat exists in the bimetallic element, not as much time will be required to heat it up to the predetermined high temperature at which the tooth 60 on the trip-out latch 56 releases the lever arm 48 to cut out the heater 70; and hence, the total toasting interval will be correspondingly reduced. In this way, the stored heat in the bimetallic element functions to inherently compensate for stored heat in the toaster.

At any time during a toasting cycle the slices may be elevated for inspection by grasping the knob 31 and elevating it slightly. When it is thus elevated it pivots the bracket 33 on the carriage 24 and causes its extension 46a to pivot the hold-down latch 41 outwardly; this causes the projection 47 on the hold-down latch to move away from the step 51 to release the carriage, and hence, the slice carriers. After the inspection, the carriage may be depressed so as to cause reengagement between the projection 47 and the step 51, and the toasting of the slices will be completed.

The basic time setting for the toaster is varied by adjusting the position of the stop 66d with reference to the position of the stop 66b; if this distance be shortened, the thermostat will bow for shorter periods of time in both heating up and cooling down to operate the trip latches 56 and 57 to terminate the toasting operation; that is, the time required for the bimetallic element to heat up to operate the trip latch 56 to cause the release of the latch arm 47, and also, to cool down to operate the trip latch 57 to effect the final release of the arm 48 will not be so great as before, and consequently, the entire toasting interval will be shortened. Conversely, if this space be increased the thermostat will bow for a longer period of time in both its heating up and cooling cycles, and therefore, will increase the entire toasting period.

The abutment 66d is mounted upon an angle lever 83 (Figs. 1, 3, 4 and 5) which is pivotally mounted upon a bracket 84 carried by the bracket 66c. This arm is pivotally secured to a pair of cooperating arms 85 and 86, each of which is provided with an elongated slot 87 (Fig. 1) that receives a projection 88 (Figs. 1, 3 and 4) provided for it on the other arm. Threaded through these projections 88 is an adjustment screw 89 which functions to factory set the effective length of the link formed by the arms 85 and 86. This link is operated vertically in the chamber 22 by means of an operating lever 90 to which the link is pivoted, as shown in Fig. 1. The lever 90 has its inner end pivotally connected to a fixed bracket 91 mounted on the front wall 10a of the heating chamber, and its outer end extending to the outside of the front of the toaster casing through a vertical slot 92 provided in the front wall of this casing. An operating knob 93 is secured to this forward end of the lever. It will be observed that by reason of this arrangement when the knob 93 is elevated it will move the abutment 66d away from the stop 66b to thereby increase the toasting interval, and that when it is depressed it will effect a reduction in the toasting interval. By reason of this arrangement, darker and lighter toasts can be obtained; and if desired the front wall may be provided with a suitable color scale, as shown in Fig. 2, to assist the attendant in setting the knob.

Suitable means are included to prevent the automatic ejection of the slices at the end of the toasting interval so as to retain the slices in the heating chambers to keep them warm, but which do permit the deenergization of the toaster heating elements at the end of this interval. This means comprises a "keeps-warm" latch 94 which is pivoted to the vertical plate 58 of the timing mechanism, as shown more clearly in Fig. 6. This latch is arranged to be moved from its full line position shown in Fig. 6 to its dotted line position of this figure so that its lower end moves into the path of movement of the latch arm 48 to prevent the ejection of the toast when this arm is released. However, the carriage 24 is permitted to move high enough to open the switch 38 to deenergize the toaster. In order to provide for this short upward movement of the carriage 24, the latch arm is provided with the second step 52, referred to above, which is arranged to engage the projection 47 to prevent the ejection of the toast.

The keeps-warm latch 94 is operated between its operable and non-operable positions by means of a keeps-warm lever 95. This lever is pivoted at its rear end to a bracket 96 fastened to the front wall 10a of the toasting chambers, and has its forward end projecting through a vertical slot 97 provided for it in the front wall 12 of the casing 11. Mounted on the forward end of the lever is a suitable operating knob 98. This lever 95 carries a pin 99 which is arranged to be received in each of a pair of cam-like recesses 100 and 101 provided in the latch 94. This latch is biased in the clockwise direction, as viewed in Fig. 6, by means of a tension spring 103, one end of which is anchored to the upper end of the latch, as viewed in Fig. 6, and the other end of which is anchored to the plate 58. When the lever 95 is in its upper position, as viewed in Figs. 2 and 6, the pin is received in the seat 100 to hold the latch in its full line position of Fig. 6, and thereby out of the way of the latch arm 48 which may be moved upwardly to permit the automatic ejection of the toast at the end of the toasting period. However, if the knob 98 be depressed so as to move the pin 99 into the seat 101 it will permit the latch 94 to be shifted slightly in the clockwise direction by the spring 103 so as to cause its lower end to move into the path of the latch arm 48 to prevent its upward movement to allow the toast to be ejected in the manner previously described.

If desired, the front wall of the toaster may be provided with suitable indicia to assist the operator in the control of the knob 98—thus the words "Pops-up" may be placed at the upper end of the slot 97 to indicate that if the knob is in this position the toast will be automatically ejected, while the words "Keeps-warm" may be placed at the bottom of the slot to indicate that if the knob is down at this end of the slot the toast will remain in the heating chambers and be kept warm.

It is to be noted that if the knob 98 be in its lower "Keeps-warm" position so as to prevent the ejection of the toast, the toast may be ejected by elevating the knob 98 to release the catch arm 48 and thereby the projection 47 to permit the toast to be ejected. Alternatively, the toast may be elevated by grasping the knob 31 and elevating it, which in the manner previously described, will remove the projection 47 from the step 52 and thereby permit the ejection of the slice carriers.

It is also to be noted that even if the knob 98 be left in its lower position permanently, it will not in any way affect the operation of the toaster, except to prevent the automatic ejection at the end of the toasting interval. In other words, even if the knob 98 be in its lower position, and the toast when done ejected by the manual operation of the knob 31, this knob may again be depressed to initiate a subsequent toasting operation and to start the timing mechanism to function. The latch arm 48 will be depressed and locked by the trip latches 56 and 57, as before, and the timing mechanism will function in exactly the manner previously described to measure the toasting period and to release the latch arm 48 for movement up against the lever 94.

The "Keeps-warm" arrangement just described is described and claimed in the co-pending application of Walter R. Weeks, Serial No. 422,612, filed December 12, 1941, and assigned to the same assignee as this invention.

While I have shown a particular embodiment of my invention, it will be understood, of course, that I do not not wish to be limited thereto since many modifications may be made, and I, therefore, contemplate by the appended claims to cover any such modifications as fall within the true spirit and scope of my invention.

What I claim as new and desire to secure by Letters Patent of the United States is:

1. An automatic toaster comprising a toasting chamber, means for heating said chamber, a slice carrier mounted in said chamber for movement from an upper non-toasting position to a lower toasting position, means biasing said carrier to move upwardly, means for moving said carrier downwardly to its toasting position, a pivoted latch arm movable in a predetermined plane and constructed and arranged to engage said carrier to hold it in said toasting position against the force of said biasing means when said latch arm is in one position and to release it when moved upwardly from said one position to another, a pair of trip latches on opposite sides of said latch arm provided with trip hooks adjacent one end of the latches, means pivotally mounting said trip latches intermediate their ends so that they move in a plane extending transversely of the plane of movement of said latch arm and so that the hook on the first trip latch is lower than that of the second, a spring acting on the other ends of said trip latches so as to bias said one ends together toward said latch arm whereby the latch arm may be engaged by said hooks to prevent movement thereof to said second position and thereby to hold said carrier in each of two positions for toasting, a thermostatic element for controlling the operation of said trip latches operable between said one ends, and means for heating said thermostatic element to cause it to move from a first to a second position and then permitting it to cool to return to the first position all during the toasting interval, said thermostatic element when moving to the second position moving said trip latches so that said first trip latch releases said latch arm and said second trip latch intercepts it to prevent upward movement of said carrier, and when returning to said first position operating said second trip latch to release said latch arm and thereby said carrier.

2. An automatic toaster comprising a toasting chamber, means for heating said chamber, a slice carrier mounted in said chamber for movement from an upper non-toasting position to a lower toasting position, means biasing said carrier to move upwardly, means for moving said carrier downwardly to its toasting position, a latch arm pivoted to move on an axis in a predetermined plane, and constructed and arranged to engage said carrier to hold it in its toasting position against the force of said biasing means when it is in one position on said axis and to release it when removed to another position on said axis, a pair of trip latches pivotally mounted on opposite sides of said latch arm to move in a plane substantially at right angles to the plane of movement of said latch arm, and provided with trip hooks for successively engaging said latch arm to prevent movement of said arm to said second position and thereby said carrier to said non-toasting position, a thermostatic element controlling said trip latches so that when it is in a first position one of said latches holds said latch arm in said first position and when moved to a second position operates said latches so that said one latch releases said latch arm and the other holds it, and also when returned to said first position it operates said other trip latch to release said latch arm and carrier, and means for heating and cooling said thermostatic element during the toasting interval to cause it to move from said first to said second position and to return to said first.

3. An automatic toaster comprising a toasting chamber, means for heating said chamber, a slice carrier mounted in said chamber for movement from an upper non-toasting position to a lower toasting position, means biasing said carrier to move upwardly, means for moving said carrier downwardly to its toasting position, heat up-cool down thermal timing means controlling said carrier to release it at the end of the toasting interval including a bimetallic thermostatic element, means loosely supporting said element so as to provide for free bending movement of both end portions thereof, adjustable stop means for limiting the free movement of one of said ends, a pair of trip latches on opposite sides of the other end of said element movable in a plane extending transversely of said thermostatic element, a latch arm, means pivotally mounting said latch arm so that a portion thereof is projected between said trip latches to move in a plane intersecting the plane of movement of said trip latches, said latch arm constructed and arranged when moved to one position to engage a part on said carrier to hold the carrier in its toasting position and when moved to another position to release said carrier, and each of said trip latches constructed and arranged to engage said portion of said latch arm to prevent movement of said carrier to said non-toasting position, one of said trip latches being operated by said other end of said thermostatic element to release said latch arm and carrier when said other end is moved responsively to the heating of said thermostatic element and the other trip latch being operated by said movement of said other end to latch said latch arm and carrier, and said latter trip latch being operated by said movement of said other end responsively to the cooling of said thermostatic element to release said latch arm and carrier, heating means for heating said thermostatic element, control means for said heating means operated by said other end so as to apply heat to said element to cause it to operate said one trip latch to release said latch arm and carrier and the other trip latch to latch said latch arm and carrier, and then to cut off the heat from said element to permit it to cool and operate said other trip latch to release said latch arm and carrier, and means for adjusting said stop means to predetermine the permissible free movement of said one end of said bimetallic element so as to set the basic toasting interval.

4. An automatic toaster comprising a toasting chamber, means for heating said chamber, a slice carrier mounted in said chamber for movement from an upper non-toasting position to a lower toasting position, means biasing said carrier to move upwardly, means for moving said carrier downwardly to its toasting position, a hold-down latch mounted on said carrier for limited vertical movement with reference to it, a latch arm for engaging said hold-down latch when said latch arm is in a first position to prevent return movement of said carrier to its non-toasting position and movable to a second position to release said hold-down latch to permit said carrier to return to its toasting position, time element controlled locking means for said latch arm to hold it in said first position and operating to release it to permit it to move to its second releasing position at the end of the toasting interval, a loading arm connected to said carrier and movable to engage said latch arm to move it to said first position when said carrier is depressed, means mounting said loading arm on said carrier for movement out of the path of movement of said latch arm, and connection means between said hold-down latch and said loading arm for moving the latter out of the path of movement of said latch arm responsively to the limited relative movement between said carrier and said hold-down latch effected by said biasing means after said latch arm has engaged said latch and provided for by the mounting means between said hold-down latch and said carrier.

HEBER L. NEWELL.